Aug. 2, 1949.  W. JAFFA  2,477,876
COMBINATION PAN AND BRUSH
Filed Oct. 27, 1945
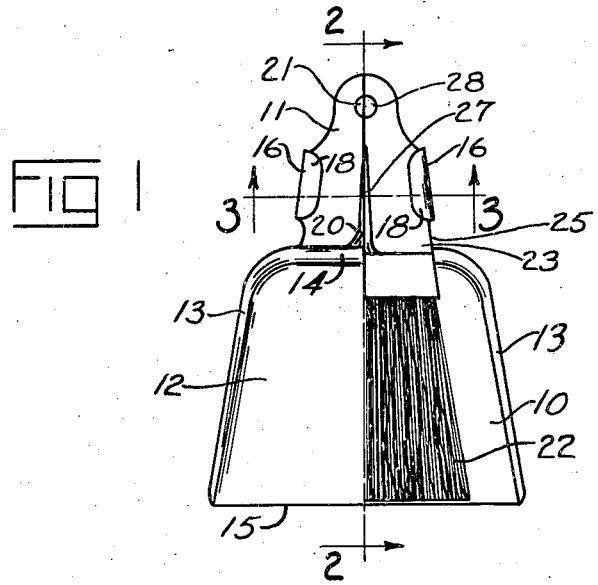
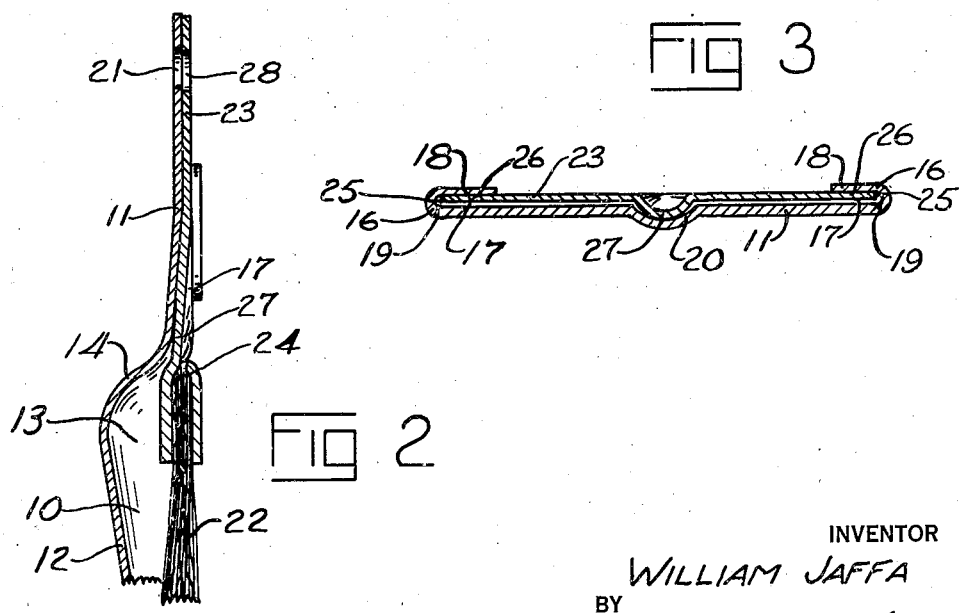
INVENTOR
WILLIAM JAFFA
BY
G. H. Braddock
ATTORNEY Patented Aug. 2, 1949

2,477,876

UNITED STATES PATENT OFFICE 2,477,876

COMBINATION PAN AND BRUSH

William Jaffa, Minneapolis, Minn.

Application October 27, 1945, Serial No. 625,085

1 Claim. (Cl. 65—62)

This invention has relation to a combination pan and brush.

An object of the invention is to provide a combination pan and brush adapted to be detachably assembled in novel and improved manner.

A further object is to provide a new and improved combination pan and brush which will consist of a pan in the nature of a dust pan and a brush in the nature of a whisk broom adapted to be detachably assembled in unique and simple manner.

A further object is to provide a combination pan and brush which will be of simple, inexpensive, new, improved and practical construction.

And a further object is to provide a combination pan and brush which will incorporate features and characteristics of construction as hereinafter set forth.

With the above objects in view, as well as others which will appear as the specification proceeds, the invention comprises the construction, arrangement and combination of parts as now to be fully described and as hereinafter to be specifically claimed, it being understood that the description herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a top plan view of a combination pan and brush made according to the invention, a portion of the brush being omitted;

Fig. 2 is an enlarged longitudinal sectional view, partially broken away, taken on line 2—2 in Fig. 1; and Fig. 3 is an enlarged transverse sectional view, taken on line 3—3 in Fig. 1.

With respect to the drawing and the numerals of reference thereon, 10 denotes the body and 11 indicates the handle of a pan. As disclosed, said pan is in the nature of a dust pan.

The pan body 10 is constituted as a scooped-out member including a base portion 12, spaced apart side portions 13, 13 upstanding from said base portion and a rearward portion 14, also upstanding from the base portion 12, which extends between the spaced apart side portions 13, 13. The pan is open at its forward portion and its forward edge 15 is substantially parallel with its upstanding rearward portion 14. As shown, the opposite ends of the rearward portion 14 merge smoothly into the rearward ends of the spaced apart side portions 13, 13, and said spaced apart side portions diverge slightly from rear toward front of the pan.

The pan handle 11 is situated substantially at the midlength of the upper edge of the rearward portion 14 and extends rearwardly of said rearward portion in a plane substantially parallel with the plane of the base portion 12 of the pan body 10. Said pan handle 11 has width equal to a dimension somewhat less than the dimension representing the length of the rearward portion 14, and the central part of said rearward portion merges integrally and smoothly into said pan handle.

The opposite side edge portions of the pan handle 11 are bent forwardly and inwardly upon themselves, as at 16, 16, to provide rectilinear channels 17, 17 at the opposite sides of said pan handle which open toward each other. Stated otherwise, inwardly extending flanges 18, 18 at the opposite side margins of the pan handle 11 in spaced, parallel relation to the forward surface of said pan handle provide rectilinear channels 17, 17 at the opposite sides of the pan handle which face toward each other. The bases 19, 19 of the channels 17, 17 are in diverging relation in direction from rear to front of the pan.

A longitudinally extending groove in the forward surface of the pan handle 11 is denoted 20. Said longitudinal groove 20 is situated substantially at the midwidth of said pan handle 11 and extends from about the location of the midlength of the rearward portion 14 of the body 10 of the pan toward the rear of the pan handle substantially in perpendicular relation to said rearward portion 14 and the forward edge 15 of said body 10. As shown, the longitudinally extending groove 20 is of comparatively great width and depth at its forward portion, of relatively narrower width and less depth at its rearward portion and tapers more or less regularly as to width and depth in direction from front toward rear of the pan handle. An opening 21 in the rearward end portion of said pan handle is for receiving means, such as a nail or string, for supporting the pan. The opening 21 is at the transverse center of the pan in alined relation with the longitudinally extending groove 20 and the rearward end of said longitudinally extending groove terminates in slightly spaced relation to said opening 21 in the disclosure as made.

Numeral 22 denotes the bristles and 23 indicates the handle of a brush. As disclosed, said brush is in the nature of a whisk broom. The bristles 22 may be assembled with the brush handle 23 in any suitable and convenient manner, as represented generally at 24.

Said brush handle 23 is constituted as a substantially flat piece of suitable material the spaced apart, opposite side edges 25, 25 of which are in diverging relation in direction from rear to front of the brush. Said opposite side edges 25, 25 of the brush handle have about the same relative arrangement as do the bases 19, 19 of the channels 17, 17 of the pan handle 11. That is, the opposite side edges 25, 25 are spaced apart a distance about equal to the distance between the bases 19, 19, and said opposite side edges diverge to a degree about equal to the degree or extent of divergence of said bases. Also, the opposite side edge portions 26, 26 of the brush handle 23 are of thickness nicely to be received within the channels 17, 17 of the pan handle 11 provided by the forwardly and inwardly bent flanges 18, 18.

A longitudinally extending rib on the rearward surface of the brush handle 23 is indicated 27. Said longitudinal rib 27 is situated substantially at the midwidth of said brush handle 23 and extends from about the location of the bristles toward the rear of the brush handle in parallel relation to said bristles. As shown, the longitudinally extending rib 27 is of comparatively great width and depth at its forward portion, of relatively narrower width and less depth at its rearward portion and tapers more or less regularly as to width and depth in direction from front toward rear of the brush handle. An opening 28 in the rearward end portion of said brush handle 23 is for receiving means, such as a nail or string, for supporting the brush. The opening 28 is at the transverse center of the brush and in alined relation with the longitudinally extending rib 27 and the rearward end of said longitudinally extending rib terminates in slightly spaced relation to said opening 28.

It will be evident that the pan and brush selectively can be assembled together and disconnected. To accomplish assembly of said pan and brush, the brush handle 23 will be moved rearwardly along the pan handle 11 in such manner that the opposite side edge portions 26, 26 and the longitudinally extending rib 27 of said brush handle are slid along the channels 17, 17 and the longitudinally extending groove 20, respectively, of said pan handle. The construction and arrangement desirably will be such that the divergent opposite side edges 25, 25 of the brush handle will meet the divergent bases 19, 19 of the channels 17, 17 when the openings 21 and 28 in the pan handle and the brush handle, respectively, are in alinement as in Figs. 1 and 2 of the drawing. The construction and arrangement also desirably will be such that with assembly of the brush handle and the pan handle, the longitudinally extending rib 27 will be pushed sidewise or forwardly, with a camming action, away from the pan handle 11 as said longitudinally extending rib is caused to ride over the surface defining the bottom of the longitudinally extending groove 20, thus to cause the opposite side edge portions 26, 26 of the brush handle to be pressed against the interior surfaces of the forwardly and inwardly extending flanges 18, 18 upon the pan handle as disclosed in Fig. 3 of the drawing. The pan and brush when assembled are not liable to become accidentally separated. Said pan and brush can, however, be readily and easily disassembled for use when this is intentional merely by withdrawing the brush handle from the channels provided upon the pan handle.

It will be apparent that the brush handle could include channels such as 17, 17 to receive opposite side edge portions such as 26, 26 of the pan handle. That is to say, the brush handle could include flanges such as 18, 18 which extended rearwardly and inwardly to provide channels for receiving opposite side edge portions such as 26, 26 of the pan handle.

What is claimed is:

In combination, a pan including a handle, a brush including a handle adapted to be detachably assembled with said pan handle, inwardly extending flanges upon opposite side edge portions of one of said handles providing oppositely disposed channels in facing relation to each other defining surfaces at the bases of said channels arranged in divergent relation, oppositely disposed side edge portions upon the other of said handles being adapted to lie in said channels, respectively, a longitudinal groove in one of said handles, and a longitudinal rib upon the other handle adapted to lie in said longitudinal groove and to engage said handle having said longitudinal groove with a camming action during assembly of said handles and cause said opposite side edge portions to become engaged against said inwardly extending flanges.

WILLIAM JAFFA.

REFERENCES CITED

The following references are of record in the file of this patent:

UNITED STATES PATENTS

| Number | Name | Date |
|---|---|---|
| 113,985 | Daniels et al. | Apr. 25, 1871 |
| 219,875 | Richmond | Sept. 23, 1879 |
| 320,742 | Allen | June 23, 1885 |
| 681,303 | Dille | Aug. 27, 1901 |
| 924,059 | Grobe | June 8, 1909 |
| 961,965 | Ivers | June 21, 1910 |
| 1,349,582 | Peterson | Aug. 17, 1920 |
| 1,353,222 | Dietzel | Sept. 21, 1920 |
| 1,402,547 | Stosser | Jan. 3, 1922 |
| 1,424,761 | Hall | Aug. 8, 1922 |
| 1,598,168 | Stosser | Aug. 31, 1926 |
| 1,681,082 | Bamburger | Aug. 14, 1928 |
| 1,696,076 | Bruni | Dec. 18, 1928 |
| 2,255,715 | Samms | Sept. 9, 1941 |